United States Patent [19]

Peccenini et al.

[11] 4,268,574
[45] May 19, 1981

[54] PREFABRICATED SELF-SUPPORTING PANELS AND MANUFACTURE PROCESS THEREOF

[75] Inventors: Paolo Peccenini, Villagrappa; Paolo Romini, Ravenna, both of Italy

[73] Assignee: Pantec S.r.l., Forli, Italy

[21] Appl. No.: 57,203

[22] Filed: Jul. 13, 1979

[30] Foreign Application Priority Data

Jul. 13, 1978 [IT] Italy ................................ 25654 A/78

[51] Int. Cl.³ ............................ B32B 5/18; B32B 5/22
[52] U.S. Cl. .................................. 428/315; 52/309.11; 52/309.14; 52/309.15; 156/78; 156/79; 156/332; 252/8.1; 264/45.3; 264/DIG. 6; 264/DIG. 17; 264/DIG. 39; 423/328; 428/308; 428/309; 428/331; 428/921; 521/91; 521/92
[58] Field of Search .......................... 106/18.12, 18.26; 52/232, 309.11, 309.14, 309.15, 415; 156/79, 297, 299, 332; 252/8.1, 441; 264/15, 45.3, DIG. 6, DIG. 17, DIG. 39; 423/327, 328; 428/306, 308, 309, 310, 402, 403, 192, 921, 331, 920, 315; 521/86, 91, 92

[56] References Cited

U.S. PATENT DOCUMENTS

| | | | |
|---|---|---|---|
| 4,017,316 | 4/1977 | Renkey et al. | 428/921 X |
| 4,041,199 | 8/1977 | Cartwright | 428/331 X |
| 4,086,382 | 4/1978 | Hites | 428/168 |
| 4,107,376 | 8/1978 | Ishikawa | 428/306 |
| 4,122,203 | 10/1978 | Stahl | 428/309 |
| 4,169,915 | 10/1979 | Heitmann et al. | 428/310 |
| 4,193,829 | 3/1980 | Kourtides et al. | 428/402 X |

FOREIGN PATENT DOCUMENTS

| | | | |
|---|---|---|---|
| 48-32176 | 10/1973 | Japan | 428/331 |
| 54-08012 | 4/1979 | Japan | 428/331 |

*Primary Examiner*—John T. Goolkasian
*Assistant Examiner*—Robert A. Dawson
*Attorney, Agent, or Firm*—Bucknam and Archer

[57] ABSTRACT

Prefabricated self-supporting panels having at least two outer layers and one inner layer provided with a foamed mixture, wherein the inner layer comprises unsaturated polyester resins, hollow microspheres of aluminum phyllosilicate having an average diameter of 150 microns and density of 0.7 kg/cu.dm., and a coupling agent of the organofunctional silane type.

The process for the manufacture of these panels has also been described.

15 Claims, No Drawings

PREFABRICATED SELF-SUPPORTING PANELS AND MANUFACTURE PROCESS THEREOF

The panels according to the present invention are manufactured articles characterized by a structure having three or more layers, wherein the outer layers perform a protective and aesthetic function, while the inner layer(s) are for imparting thereto the basic properties characterizing the panel. In this type of panels hitherto used, the core, that is the intermediate layer(s), were generally provided from a foamed mixture, whereas the formation of the outer layers was provided either by special agglomerate slabs of unsaturated polyester resins reinforced by glass fibers, or by slabs of other material, if necessary reinforced by known techniques, the materials for the manufacture of these layers being selected depending on the specific use of each type of panel.

Thus, due to the particular characteristics hereinafter described, the possibilities of use for panels of this type range from building to furnishings, from padding to lining, from formation of ceilings to that of actual supporting floors, in latter case the panels being previously completed with the trimming mantle.

The panels hitherto used are externally provided with agglomerate slabs of unsaturated polyester resins, or other thermosetting resins, or with layers of marble or granite grit. However, notwithstanding the efforts made, it has not been possible up to the present time to provide slabs of large sizes which, with thickness less than 6 mm, exhibit along with a pleasant aesthetic appearance good chemical-physical characteristics and an acceptable dimensional stability. The main aesthetic defects found in manufactured articles already in use are as follows: microporosity and microcracks in the surface due to air bubbles, with a resulting dulling of the surface due to high water absorption and still, when the surface carries a transparent "gel coat", the yellowing of such a layer due to weathering with a resulting change in color, particularly where marbles and granites of light color are used.

Another problem is related to the absolute flatness of the slabs. Thus, in order to impart higher mechanical characteristics to the slab, reinforcements are applied with glass fibers impregnated with resin (fiberglass-reinforced plastic); during such an operation, tensions or stresses are developed between the agglomerate slab and fiberglass-reinforced plastic reinforcement, with resulting distortions in the flatness of the reinforced slab.

It is the primary object of the present invention to provide a panel having improved mechanical characteristics over those hitherto known.

It is another object of the present invention to provide panels of large size with minimal distortions, that is absolute flatness of the slabs.

The above specified objects have been accomplished by providing the use of foamed materials based on unsaturated polyester resins and mineral fillers, particularly those of light weight, as well as those of hollow microspheres type of a very small diameter (about 150 microns) based on aluminum phyllosilicate (specific gravity 0.7 kg/cu.dm) and optionally those of granular type based on foamed clay (diameter 15 to 20 mm, specific gravity 0.35 kg/cu.dm), also comprising silicates. Many of the mechanical features of the foamed material depend on the cellular structure and thickness of the cell wall. It is preferable that the cell wall be quite thick: therefore, a specific gravity of the foamed mixture not less than 0.12 kg/cu.dm are desirable, and more particularly a density of 0.13 kg/cu.dm is normally used.

Due to the silicic nature of the filler involved the organo-functional silanes are advantageously exploited to improve the mechanical characteristics of the compound.

Thus, organo-functional silanes are ingredients which, when added to the unsaturated polyester resin in percentages from about 0.1 to 5.0%, provide an actual "chemical bridge" between the matrix of unsaturated polyester resin and the surface of the grit filler of the outer layer. Such an action occurs through a known mechanism, which is herein briefly described.

The general structure of an organo-functional silane is as follows:

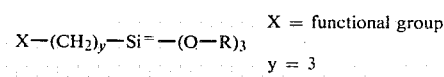

$$X = \text{functional group}$$
$$y = 3$$

Organo functional silanes have a bipolar structure and the two poles show chemical reactivities of completely different type. Due to the presence of the hydrocarbon chain and functional group X, the organophilic pole can interact with polymer type materials, as those of many matrices. The hydrophilic pole of an organofunctional silane is provided with a so-called silicic reactivity, since the reactions are prevailingly affected by the presence of one atom of silicon.

With water, there will be a rapid development of a silantriolic compound, since the —(OR) group is of alkoxy type and shows a high tendency to hydrolysis, with formation of hydroxyl groups —(OH) directly bound to silicon.

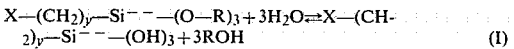  (I)

the silantriolic group can interact with the hydroxy groups present on the surface of oxides (for example, $SiO_2$, $Al_2O_3$, $TiO_2$, $Fe_2O_3$) or metals (such as Al, Fe).

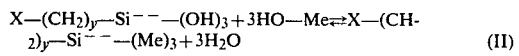  (II)

Me = Si, Al, Fe, Ti, etc.

The next stage involves the reaction of the functional group X and organic polymer, thus forming the "chemical bridge".

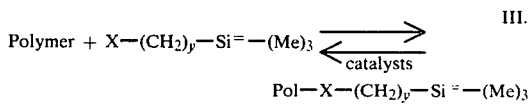

III.

It is required for the above reaction that the group X be chemically reactive with the organic polymer, with which it will be able to give rise to reactions of condensation or addition of the ionic or radical type.

Particularly suitable for use with unsaturated polyester resins are vinyl silanes and particularly methacryl silanes:

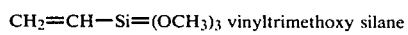 vinyltrimethoxy silane

-continued $$CH_2=\underset{CH_3}{\underset{|}{C}}-CO-O-(CH_2)_3-Si-(OCH_3)_3 \quad \gamma\text{-metacryloxy-propyltrimethoxysilane}$$

the vinyl or methacryl radical can copolymerize by a radical addition reaction with the chain of unsaturated polyester.

Suitable resins among the unsaturated polyester resins have been found those based on hexachloro-endomethylene tetrahydrophalic anhydride (H.E.T. acid) and, where particular heat resistance properties up to 250° C. are required, resins containing triallylcyanurate as a monomer, which is a trifunctional product forming a very stable reticulated system when reacting with suitably designed polyester chains. A foaming agent is added to the mixture of the unsaturated polyester resin, the hollow microspheres and the organosilane prior to heating to permit foaming.

EXAMPLE I

| Component I | |
|---|---|
| Unsaturated polyester resin | 100 pp |
| Water | 2–3.5 pp |
| 15% dimethylaniline | 0.5 pp |
| Siliconic stabilizer | 0.5 pp |
| Antimoy trioxide | 10 pp |
| Hollow microspheres φ = 150 microns | 10–20 pp |
| Organo-functional silane | 0.5–5 pp |
| Component II | |
| Raw MDI | 30–50 pp |
| 50% benzoyl peroxide | 1–4 pp |
| No granular filler | |

Compositions as that shown are relatively simple to prepare: with the aid of a small fast mixer, first component I is prepared and then component II. Then, component I is rapidly mixed with component II. The preparation which exhibits good fluidity can be poured into the gap to be filled between the slabs of the outer layer previously placed in the die made of cristalline plastic material (of polyethylene or polypropylene type) arranged in the press or other suitable device for resisting the pressure being exerted by the material during expansion.

After about 10–15 minutes from casting or pouring, the expansion starts and is carried out in accordance with known chemical mechanisms. The final density of the mass is about 200 kg/cu.m. Hardening following the maximum expansion occurs after about 30–40 minutes.

The mechanical characteristics of the foam treated with the silanic binder are somewhat better than those corresponding to the untreated material: the comparison is shown in Table I.

TABLE I

| Characteristics | Un-treated | Treat-ed | unity of measure |
|---|---|---|---|
| Max.compressive stress | 5 | 10 | kg/sq.cm. |
| Max.compressive deformation | 2.5 | 1.5 | % |
| Compressive modulus of elasticity | 1500 | 2000 | kg/sq.cm. |

Apparent thermal conductivity of the material: 0.066 kcal/hm°C.

EXAMPLE II

| Component I | |
|---|---|
| Unsaturated polyester resin | 100 pp |
| Water | 2–3.5 pp |
| 15% dimethylaniline | 0.5 pp |
| Siliconic stabilizer | 0.5 pp |
| Antimonium trioxide | 10 pp |
| Hollow microspheres φ = 150 microns | 5 pp |
| Organo-functional silane | 0.5–5 pp |
| Component II | |
| Raw MDI | 30–50 pp |
| 50% benzoylperoxide | 1–4 pp |

The gap between the slabs is entirely filled with granules of foamed clay having an average granulometry of 20 mm and specific gravity of 350 kg/cu.m following the operations described in Example I, the preparation is poured on the granular filler when the latter has been already placed in the gap between the two slabs; the sufficient fluidity enables the liquid to pour through the interspaces between the granules to the die bottom; then the expansion reaction is started and the foam, still in the liquid state, reaches the top of the die, filling the whole free space available within the gap.

Also in this case the improvement is significant.

The total specific gravity is about 500 Kk/cu.m; the apparent thermal conductivity is 0.10 Kcal/hm°C.

The comparison is shown in Table II.

TABLE II

| Characteristics | Un-treated | Treat-ed | unity of misure |
|---|---|---|---|
| Max.compressive stress | 15 | 25 | Kg/sq.cm. |
| Compressive modulus of elasticity | 1500 | 2500 | " |
| Max.bending stress | 5 | 10 | " |
| Flexural modulus of elasticity | 1200 | 2000 | " |

There is also an improvement in the dimensional stability of the foam: a specimen of 70×15×10 cm bearing on two knives at a spacing of 60 cm, subjected to bending under a constant central load of 50% max. bending stress (T=20° C.; U.R.=50%), shows after about $10^4$ hours a permanent deformation due to viscous sliding or creep of about 0.1 mm.

According to one embodiment which provides a saving of the organo-functional silanic agent, the reinforced granular filler is pretreated.

That is, an aqueous solution of the silane can be prepared at a concentration varying from 0.1 to 1.0%. This solution may be sprayed on the granular filler, or the filler can be immersed in the solution.

Then, the granular filler is dried, and thus is ready for agglomeration with the binder based on foamed unsaturated polyester resin, but avoids the step of adding to the foaming mixture the silanic binder which is already present on the surface of the granular filler.

For providing a sandwich structure, use is made of both agglomerated slabs of resin and grit with a reinforcement of fiberglass-reinforced plastic, and slabs of other materials, such as asbestos cement, cardboarded plaster, natural wood, regenerated wood (slabs of chipped wood), phenol-formaldehyde laminates, ABS (acrylonitrile-butadiene-styrene), PS (polystyrene), PMMA (polymethylmetacrylate), aluminum, steel and the like.

A preferred type of external slab of polyester resin and grit is used.

In order to improve the interface between unsaturated polyester resin and grit, organo-functional silanes are used.

The unsaturated polyester resin, selected among the high temperature heat distortion types, accelerated with cobalt naphthenate octoate and added to the coupling agents based on organo-functional silanes (such as vinyl silanes or methacryl silanes) and flame-smoke proofing agents (antimonium oxide and zinc borate type) is mixed with the catalyst (organic peroxide of methylethylketone peroxide or acetylacetoneperoxide or cyclohexanoneperoxide type) and then poured into the open tray-shaped die to a thickness of about 3–4 mm.

Immediately after complete covering of the die bottom by the resin, the grit is uniformly distributed (the grit being preferably granite grit since due to high contents of silica, the effect of the silanic coupling agent will be higher) in the proportion of about 200% by weight to the binding mixture of unsaturated polyester resin; the grit shows a granulometry of 1 to 3 mm and has undergone a drying and depulverization process so that the residual moisture is not higher than 1%, and the portion with a granulometry lower than 1 mm reaches a maximum percentage of 5%.

Concurrently with the introduction of the grit within the die, short glass fibers (length 2–3 mm) provided by a cutter, may be added so as to have about 250 g cut fiber/sq.m. of die.

By gravity the grit and fiber are immersed in the resin, while a vibrosetter provides for perfectly completing the distribution and promoting the escape of air which might be entrained in the resin.

The laminate thus formed, which is about 5–6 mm thick, is allowed to harden to complete shrinkage. Hardening can be carried out both at room temperature and in an oven at 80°–100° C.; and it is only after this stage that the required reinforcements of fiberglass-reinforced plastic may be applied as impregnated mats. Thus, the tensions or stresses which would arise and which would curve or bend the reinforced slab, due to the different shrinkage coefficients under hardening, by incorporating the reinforcement on the underlying layer before complete shrinkage of the latter, are avoided.

Also when the product impregnating the reinforcement mats has achieved complete hardening (for instance in an oven or at room temperature) thus welding to the base layer, the piece may be readily removed from the die.

Use has been made of dies of "crystalline" plastic material (polyethylene PE, polypropylene PP) in order to provide a perfect separation of the molds from the die without use of separating agents, which are also expensive and not reliable. Thus, it is known that resins and cements of any type cannot be caused to adhere on such materials.

Perfect separation is an essential condition because, during the shrinkage stage, which is typical of unsaturated polyester resins, there are no catchings on the die surface. Such dies may be of high dimensions and, by way of example, dies 20 m long and 3 m wide have been made.

By selecting the particular outer layer described, the same type of unsaturated polyester resin can be used for both the outer and inner layers, thus providing a substantial simplification in the production of the panels and stock of raw materials. However, the outer slabs could also be different. However, after selecting the type of slabs externally characterizing the panel, one of the slabs is positioned at the bottom of the die which, is made of "crystalline" plastic material (PP, PE), as a vertical extension of the frame according to the thickness of the finished panel.

Upon insertion of the granular filler, the pouring is carried out for the foaming mixture containing the microspheres of aluminum phyllosilicate and organo-functional binder comprising vinyl-silane or methacrylsilane in a percentage of 0.1 to 5.0%, then the sandwich is closed with a second slab which will bear on the vertical extension of the frame of the die. The whole is then inserted in a press, dimensioned to contain the stresses developed by the expansion, and there maintained to complete reticulation of the foam. As to the type of press it should be stated that, even though particular expedients are not essential, for large industrial productions an air cushion press is particularly suitable.

Finally, it will be stated that the loaded mixture itself could be used also as filler for non-planar manufactured articles, such as fretted sheets or the like: the reason is that during expansion, the filling occupies all the zones of a gap either with constant or irregular section.

On its edge, the panel may be provided with a frame to promote its assembly and connection with other panels: such a orame is inserted as a spacing element between the slabs and in this case will determine the thickness of the finished panel. Preferably, the frame is made of iron or aluminum sheet, or plastic material or wood.

What is claimed is:

1. A process of manufacturing prefabricated self-supporting panels which consists of forming a laminate having at least two outer layers and at least one inner layer, said at least one intermediate layer being made of a foamed mixture of (a) an unsaturated polyester resin, (b) hollow microspheres of aluminum phyllosilicate of an average diameter of 150 microns and density of 0.7 kg/cu.dm in a proportion of 5 to 20% by weight based on the unsaturated polyester resin, and (c) a coupling agent which comprises at least one organo-functional silane, in the proportion of 0.1 to 5.0% by weight based on the unsaturated polyester resin and the outer layers comprise a mixture of unsaturated polyester resin, granite grit and an organo-functional silane, the latter in a proportion of 0.1 to about 5.0% with respect to the unsaturated polyester resin, and allowing hardening to occur.

2. A process according to claim 1, wherein the organo-functional silane consists essentially of vinylsilane or methacrylsilane.

3. A process according to claim 1, wherein a filler of granular foamed materials of foamed clay, having an average diameter of 15–20 mm and density of 0.35 kg/cu.dm. is added to said inner layer.

4. A process according to claim 3 wherein the foamed clay is pretreated with 0.1–1.0% aqueous solution of an organo-silane and then dried.

5. The process according to claim 1 wherein the foamed mixture of said intermediate layer has specific gravity not less than 0.12 kg/cu.dm.

6. The process according to claim 1 wherein the unsaturated polyester resin is based on hexachloroendomethylene tetrahydrophthalic anhydride.

7. A process according to claim 6 wherein the unsaturated polyester resin is of the type resistant to flame and high temperature heat distortion.

8. A process according to claim 1 wherein the outer layer additionally contains short glass fibers.

9. The process according to claim 8 wherein the fiberglass-reinforced plastic reinforcement is incorporated into the outer layer prior to hardening.

10. The process according to claim 1 wherein said panels are flat and free from distortion.

11. The process according to claim 1 wherein the unsaturated polyester resin in said at least one outer layer is different from the unsaturated polyester resin in said at least one intermediate layer.

12. A prefabricated self-supporting panel which consists of a laminate having at least two outer layers and at least one inner layer, said at least one inner layer being made of a foamed mixture comprising:
(a) an unsaturated polyester resin,
(b) hollow microspheres of aluminum phyllosilicate having an average diameter of 150 microns and a density of 0.7 kg/dm³ in the proportion of 5-20% by weight based on the unsaturated polyester resin, and granulated material containing foamed clay having an average diameter of 15 to 20 mm and a specific gravity of 0.35 kg/dm³, and
(c) an organo-functional silane derivative in the proportion of 0.1-5%.

13. A panel according to claim 12 wherein the organic silane derivative is vinylsilane and methacrylsilane.

14. A panel according to claim 12 wherein foamed clay is added to said microspheres, said foamed clay having an average diameter of 20 mm, said clay being pre-treated with 0.1-1.0% aqueous solution of an organo silane and then dried.

15. A panel according to claim 12 wherein at least one of the outer layers is formed of a mixture of an unsaturated polyester resin, granite grit and an organo-functional silane.

* * * * *